(12) United States Patent
Eckert et al.

(10) Patent No.: US 9,793,017 B2
(45) Date of Patent: Oct. 17, 2017

(54) NUCLEAR PLANT MANIPULATOR SYSTEM

(71) Applicant: WESTINGHOUSE ELECTRIC GERMANY GmbH, Mannheim (DE)

(72) Inventors: Marko Eckert, Birkenau (DE); David Kisjuhasz, Seckenheim (DE)

(73) Assignee: WESTINGHOUSE ELECTRIC GERMANY GMBH, Mannheim (DE)

( * ) Notice: Subject to any disclaimer, the term of this patent is extended or adjusted under 35 U.S.C. 154(b) by 601 days.

(21) Appl. No.: 14/294,563

(22) Filed: Jun. 3, 2014

(65) Prior Publication Data
US 2014/0355729 A1 Dec. 4, 2014

(30) Foreign Application Priority Data

Jun. 3, 2013 (DE) .......... 10 2013 009 258

(51) Int. Cl.
*G21C 19/02* (2006.01)
*G21C 17/013* (2006.01)
(Continued)

(52) U.S. Cl.
CPC .......... *G21C 17/013* (2013.01); *G21C 19/02* (2013.01); *G21C 19/20* (2013.01); *G21C 19/32* (2013.01); *B25J 9/10* (2013.01); *B25J 13/00* (2013.01)

(58) Field of Classification Search
CPC ........ G21C 19/32; G21C 19/20; G21C 19/02; G21C 17/013; B25J 9/10; B25J 13/00
(Continued)

(56) References Cited

U.S. PATENT DOCUMENTS

| 4,136,957 | A |   | 1/1979 | Uno et al. |
| 4,272,781 | A | * | 6/1981 | Taguchi ............ G01N 27/9093 348/138 |

(Continued)

FOREIGN PATENT DOCUMENTS

| JP | 2003255076 A | 9/2003 |
| JP | 2004108782 A | 4/2004 |

(Continued)

OTHER PUBLICATIONS

English translation of German Patent Office Action dated Jan. 24, 2014 in application 102013009258.2.*

(Continued)

*Primary Examiner* — Peter M Poon
*Assistant Examiner* — Daniel Wasil
(74) *Attorney, Agent, or Firm* — Buchanan Ingersoll & Rooney PC

(57) ABSTRACT

A nuclear plant manipulator system, including a manipulator with an image acquisition device and a remotely-controlled drive, wherein the image acquisition device is configured to capture image data, a remote-operating device is configured to remotely control the manipulator, an object counter is configured to be incremented or decremented, and an analysis device is configured to receive the image data captured by the image acquisition device and evaluate the received image data. The analysis device is configured to automatically identify respective known objects that are found along a path while the manipulator moves along the path. When a respective known object along the path is passed by the manipulator, the object counter is incremented or decremented depending on the direction of the manipulator along the path. A current value of the object counter is provided to the remote-operating device.

20 Claims, 4 Drawing Sheets

(51) Int. Cl.
  *G21C 19/20* (2006.01)
  *G21C 19/32* (2006.01)
  *B25J 9/10* (2006.01)
  *B25J 13/00* (2006.01)

(58) Field of Classification Search
  USPC .................................... 376/248, 249, 258
  See application file for complete search history.

(56) References Cited

U.S. PATENT DOCUMENTS

| | | | |
|---|---|---|---|
| 4,832,902 A | | 5/1989 | Kaufmann et al. |
| 5,594,764 A | * | 1/1997 | Cooney .................. G21C 17/08 376/258 |
| 6,282,461 B1 | * | 8/2001 | Gan ....................... B25J 9/1697 382/106 |
| 6,959,267 B2 | * | 10/2005 | Le ........................ G01N 27/902 702/189 |
| 2007/0140403 A1 | | 6/2007 | Yuguchi et al. |
| 2012/0128113 A1 | | 5/2012 | Park et al. |

FOREIGN PATENT DOCUMENTS

| | | |
|---|---|---|
| JP | 2004110107 A | 4/2004 |
| JP | 2007057357 A | 3/2007 |

OTHER PUBLICATIONS

German Office Action issued on Jan. 24, 2014, by the German Patent Office in corresponding German Patent Application No. 102013009258.2.

European Search Report dated Oct. 8, 2014, issued by the European Patent Office in the corresponding European Application No. 14001753.4. (2 pages).

* cited by examiner

NUCLEAR PLANT MANIPULATOR SYSTEM

RELATED APPLICATION

This application claims priority under 35 U.S.C. §119 to Germany Patent Application No. 10 2013 009 258.2 filed in Germany on Jun. 3, 2013, the entire content of which is hereby incorporated by reference in its entirety.

FIELD

The present disclosure relates to a nuclear plant manipulator system, having, for example, a manipulator with an image acquisition device and remote-control drive, a remote-operating device as well as an analysis device for analyzing image data of the image acquisition device. The disclosure also relates to a method for controlling a manipulator of a nuclear plant manipulator system.

It is known that in nuclear plants, for minimizing any operating risks, significant costs as regards maintenance and testing of the plant components or their individual parts is desirable. Thus, for example, the screws in the inner walls of a nuclear pressure vessel are to undergo routine testing and are to be replaced as appropriate.

Highly radioactive areas of use in which corresponding maintenance or repair work is carried out are involved, such that safety precautions are used to protect the personnel. Manipulators are used that are remote-controlled through the corresponding area of use, whereby the components to be tested are approached and examined sequentially. A manipulator can be defined as a device that can move independently via a drive, and that is remote-controlled. This is, for example, done by operating personnel who are stationed away from the manipulator, based on an image that is recorded by a camera on the manipulator. To be able to implement testing or maintenance work, corresponding manipulators are equipped with measuring devices—for example an ultrasonic testing system or a device for replacing screws or the like.

However, an image signal by itself may not be sufficient to make it possible for the operators to guide the manipulator through an area safely. Known position-recognition systems may not be suitable because of the extremely unfavorable boundary conditions in the radioactive areas of use, which can be covered with heavy metal plates or else lie completely under water. In such cases, gyroscopes that provide additional information of the current position of the manipulator with use of extensive control electronics can be used.

In the above-mentioned state of the art, however, such a position-recognition system can be relatively heavy, which can effect using an immersion contactor as a manipulator. Moreover, despite corresponding protective measures, the extensive control electronics can be very susceptible to the high radioactivity in the area of use.

SUMMARY

A nuclear plant manipulator system is disclosed, comprising: a manipulator with an image acquisition device and remote-control drive; a remote-operating device; and an analysis device for evaluating image data of the image acquisition device, wherein the analysis device is configured such that when the manipulator moves along a path of movement based on image data, known objects that are found along the path of movement are automatically identified, and when such an object is passed, depending on direction an object counter is incremented or decremented, and a current value of the object counter is provided to the remote-operating device.

BRIEF DESCRIPTION OF THE DRAWINGS

Exemplary embodiments are depicted in the drawings, which along with exemplary advantages will be described in more detail in the detailed description to follow, wherein.

DETAILED DESCRIPTION

Figure 1:
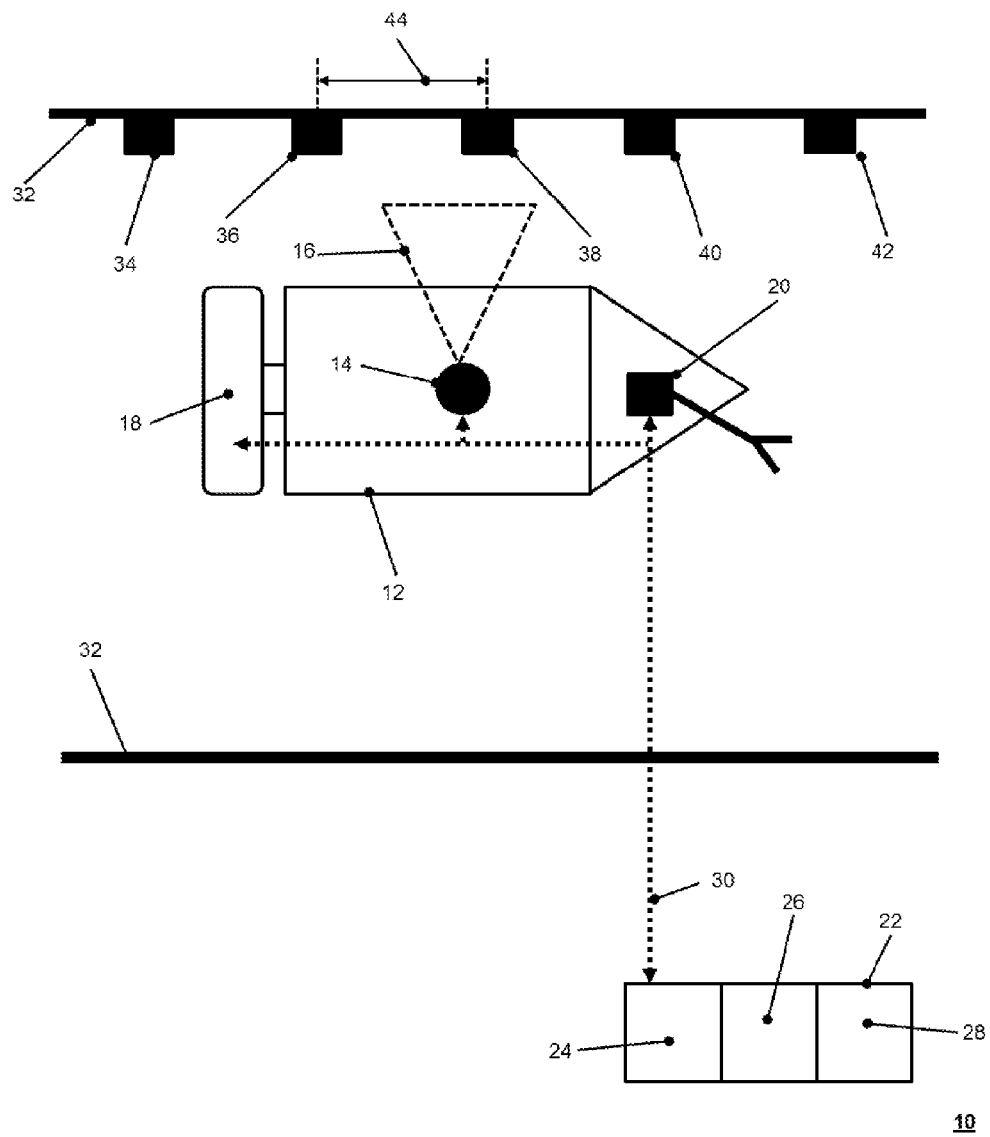
FIG. 1 shows an exemplary nuclear plant manipulator system.

A nuclear manipulator system is disclosed, in which a reduced number of electronic components (e.g., as few as possible) are exposed to radiation and which, moreover, still has a low weight. A corresponding method is also disclosed for determining position.

In an exemplary embodiment, a nuclear plant manipulator system of the above-mentioned type is disclosed. This is characterized in that the analysis device is configured in such a way that when the manipulator moves along a path of movement based on image data, known objects that are located along the path of movement are automatically identified, and when such an object is passed, an object counter is incremented or decremented, and that the current value of the object counter is provided to the remote-operating device. In this connection, the analysis device ideally is not located together with the manipulator in the radioactive area of use but rather is stationed away therefrom, for example integrated in the remote-operating device in a control room for the operators.

Exemplary embodiments involve ultimately eliminating an additional measuring system with, for example, a gyroscope and determining the desired positional data with knowledge and use of the geometric boundary conditions in the area of use by an improved analysis of the image data that are available in any case. The geometry of the area of use as such is always known; for example, the footprint of a nuclear pressure vessel or the footprint of a secondary side of a steam generator. Moreover, such an area of use is also distinguished by a certain regularity or symmetries and recurring identical geometric sections. A recurring geometric section can be, for example, a respective screw on the inner wall of a nuclear pressure vessel, which is repeated at equidistant intervals over the entire periphery of the nuclear pressure vessel.

The nuclear plant manipulator system as disclosed herein can specifically make use of these geometric regularities by known and repeating objects such as screws or the like being automatically counted in a movement along the path of movement of the manipulator. When the distance between the respective screws or objects is known and, moreover, is also even identical, for example, the covered path can be calculated based on the number of objects that have been passed during a movement by simple multiplication of the regular distance between two objects. Depending on the direction of movement of the manipulator, in forward motion, the object counter can be incremented when an identified object is passed, and in reverse motion, it can be decremented.

Identification of objects based on image data by the analysis system can be simple to implement because of the, in most cases, clear geometric shapes and the low diversity of shapes of the objects in a nuclear plant that are present in an area to be examined. Advantageously, additional reliable positional data are thus made available to the operators who direct the manipulator through the area by remote control. Due to the elimination of an additional position-recognition system, the weight of the manipulator can be advantageously reduced, and the number of electronic components that are exposed to radiation can be reduced. The analysis device that undoubtedly has a number of electronic components is not provided directly on the manipulator according to exemplary embodiments of the invention but rather in a protected area outside of the area of use.

According to an exemplary preferred embodiment of nuclear plant manipulator system disclosed herein, the manipulator is an immersion contactor; e.g., ultimately designed like a submarine. This can make it possible to work in underwater areas such as the nuclear pressure vessel, which for its part is distinguished by a very regular geometry—for example, the screws on its inner wall. Determining the position according to an exemplary embodiment of the invention can therefore be done especially well. A drive is possible, for example, with a kind of ship propeller. An immersion contactor is also defined as a magnetic vessel that runs under water. The latter could have, for example, a drive like a linear motor. If desired, it is possible to move an immersion contactor along a rail-like guide. For this purpose, directing the manipulator by remote control in a special way is simplified.

In another exemplary variant of a nuclear plant manipulator system according to the present invention, the image acquisition device can be pivoted relative to the manipulator, in which case its image acquisition area can be oriented both crosswise to the input direction of the drive and to an object that is identified and approached. A movement of the manipulator is for example, not carried out on an object but rather crosswise past an object. This can be, for example, a movement parallel to the inner wall of a reactor pressure vessel. In order to be able both to identify an object from the movement and to determine the passing of the manipulator past the object, an orientation of the image acquisition device in a direction crosswise to the driving direction can be advisable during the movement of the manipulator, which driving direction is thus directed specifically toward the respective objects. When, however, an object is to be approached deliberately, for example for examination purposes, an orientation of the image acquisition device in the driving direction is advisable. Thus, the respective object of interest is also in the image acquisition area, and suitable image data are made available to the analysis device in order to be able to generate, for example, suitable control signals.

According to an exemplary embodiment of the nuclear plant manipulator system disclosed herein, the remote-operating device can have a display device for showing the current value of the object counter. In a correspondingly simple geometry of the area of use, the number of objects passed is by itself sufficient additional information for the operators in order to have adequate information on the current position of the manipulator.

Following another exemplary variant of the nuclear plant manipulator system to the present disclosure, the latter is provided to determine a position of the manipulator based on known distances between the objects passed in each case and based on the current value of the object counter and to show the latter instead of or together with the current value of the object counter on the display device. This can be done, for example, as a simple segment indication or else also in graphic form in a map of the known footprint of the area of use. Such a depiction is especially easy to grasp for the operators who are to direct the manipulator through the area, so that possible navigational errors advantageously can be further reduced or avoided.

The above-mentioned data are shown to the operators according to another exemplary variant together with the acquired image data in the display device so that all available information desired for an error-free navigation is shown synchronously.

According to another exemplary variant, the manipulator has an interaction device for performing mechanical procedures or for recording measurement values. Thus, it is not only made possible to navigate the manipulator toward objects within the area of use, but rather also to take measurements corresponding thereto or to perform maintenance work such as, for example, an ultrasound measurement or the replacement of a screw.

In another exemplary embodiment of a nuclear plant manipulator system, the analysis device is configured in such a way that based on the image data provided by the image acquisition device, control signals for the drive are generated and converted so that an automatic positioning of the manipulator is made possible in an interaction position relative to an identified object. This ultimately represents an automatic positioning function, where a regulating mechanism adjusts the position of the manipulator coming from a preliminary position by corrective movements of the drive until a relative desired position is reached. However, holding a current position is also possible with such a method. In a simple case, this is, for example, the position of the identified object exactly in the middle of the image acquisition area. An automatic adjustment of the position advantageously represents a considerable saving of time.

A method is also disclosed for controlling a manipulator of a nuclear plant manipulator system. This can be characterized by the exemplary following steps:

Positioning the manipulator at a defined starting position in an area of use of a nuclear plant (e.g., associated with a zeroing of the object counter), Manual control of the manipulator along a path of movement by the remote-operating device, Continuous acquisition of image data by the image acquisition device, Continuous analysis of the image data of the data acquisition device in such a way that respective objects located along the path of movement are automatically identified and in the case of such an object passing, depending on the direction, the object counter is incremented or decremented, Provision of the current value of the object counter to the remote-operating device, so that for the manual control of the manipulator, a reference on its current position in the area of use of the nuclear plant is given to the operator.

Exemplary advantages were already indicated previously based on the nuclear plant manipulator system.

Another exemplary variant of the method according to the present disclosure is characterized by the following additional steps:

Interruption of the movement of the manipulator close to an identified object,

Orientation of the image acquisition system to the identified object,

Generation and automatic conversion of control signals for the drive based on image data, so that the manipulator is automatically positioned into an interaction position relative to the identified object.

The counting of objects that have been passed as disclosed herein can support the operators with additional positional data in the case of a segment run within the area of use to an object that is to be examined or maintained. When this object is reached, the manipulator is realigned in such a way that the drive direction is aimed toward the object. Also, the image acquisition area of the image acquisition device is directed toward the identified object. After such a manual rough positioning, an automatic adjusted fine positioning into an interaction position is carried out with corresponding corrective movements of the drive based on the analyzed image data.

After reaching the interaction position, performing a mechanical procedure or a measurement can be optionally provided by means such as the interaction device, for example an ultrasound measurement or the replacement of a screw.

FIG. 1 shows a nuclear plant manipulator system in a diagrammatic depiction 10. A manipulator 12, in this case a submarine-like immersion contactor, is located for maintenance purposes in a nuclear-plant basin that is filled with water and bounded by basin walls 32. In this case, the basin represents the area of use of the manipulator 12. The manipulator 12, moreover, has a remote-control drive 18 as well as an image acquisition device 14, whose image acquisition area 16 is oriented crosswise to the direction of travel of the manipulator 12 toward a basin wall 32. During a movement of travel of the manipulator parallel to the basin wall 32, several objects 34, 36, 38, 40, 42, located on the basin wall, move sequentially into the image acquisition area 16 of the image acquisition device.

An analysis device 24 located away from the manipulator 12 can access image data detected by the image acquisition device 14 and produced via bidirectional data communication 30. With use of an analysis program, the objects 34, 36, 38, 40, 42 can be identified in succession, and the objects passed in each case during a movement of the immersion contactor are counted. In this example, the objects 34, 36, 38, 40, 42 are in each case equidistant from one another, which is indicated with the arrow with the reference number 44. Thus, it is a simple matter to obtain the covered distance by multiplying the number of objects passed by the equidistant interval 44.

The control unit 24 can be integrated in a remote-operating device 22, which can have, moreover, a display device 26 and an input device 28. The remote-operating device 22 is thus to be defined as an interface to the operators, which via the display device produces essential information made available via the position of the immersion contactor, for example the image acquired by the image acquisition device 14 as well as the distance covered determined by the number of automatically counted passed objects 34, 36, 38, 40, 42. Based on this information, it is possible for the operators to maneuver the manipulator by means such as the input device 28 through the basin. By means such as an interaction device 20 that can be operated remotely, arranged on the manipulator 12, in this case a gripper, it is possible to perform corresponding maintenance and repair work.

Because the analysis device 24 is located outside of the basin, a special lightweight quality of the manipulator is achieved, on the one hand, and the analysis device can be also advantageously protected from the radiation prevailing in the basin, on the other.

Figure 2:
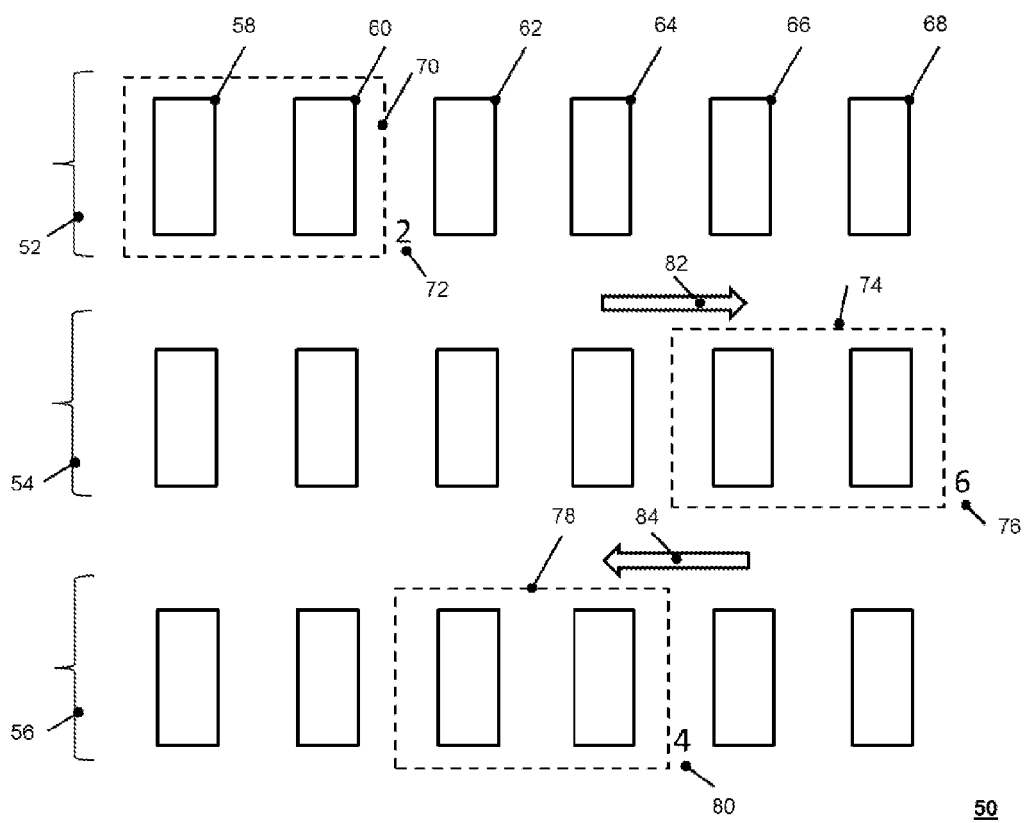
FIG. 2 shows an exemplary process example for determining position.

FIG. 2 shows a process example for determining a position in a sketch 50. A series of several objects 58, 60, 62, 64, 66, 68 is shown in three different states 52, 54, 56 in each case at another point in time together with the image acquisition area of a manipulator that is not shown and that moves. In the first state 52, the image acquisition area 70 acquires the objects 58 and 60, which were already both passed during the movement of the manipulator. At this point in time, the corresponding value of the object counter 72 is thus 2.

In the next state 54, the manipulator and thus also the image acquisition area 74 have moved four object fields further right in the direction of movement 82. The corresponding value of the object counter 76 is thus also six. In the third state 56, the direction of movement 84 of the manipulator has now reversed, and two more fields are covered. The image acquisition area 76 now acquires the objects 62 and 64. Because of the change in direction, passing one of the objects 58, 60, 62, 64, 66, 68 results in a respective decrementing of the object counter so that the value of the object counter 80 in this state 54 is now 4.

Figure 3:
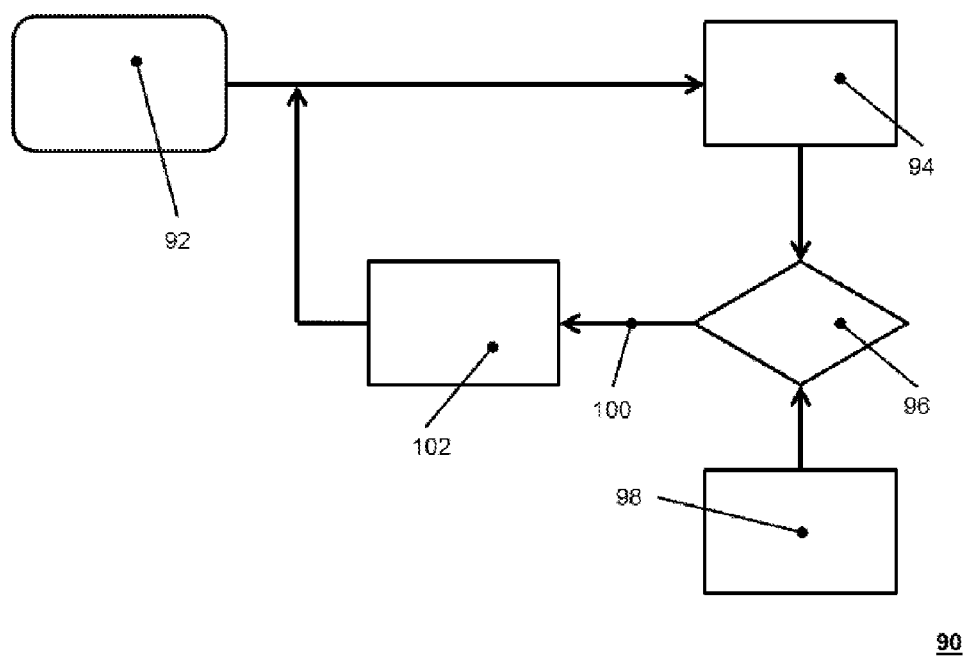
FIG. 3 shows an exemplary control diagram for positioning into an interaction position.

FIG. 3 shows an exemplary control diagram for the positioning of an interaction position in a diagrammatic depiction 90. A position 92 that is to be approached is acquired by a camera image 94. Within the framework of an image analysis 96, a difference from a pre-specified position 98, in this case holding the position, is formed. In practical terms, this means that the object, for example, is always to lie exactly in the middle of the image acquisition area. Any drifting of the object from the center of the image acquisition area, i.e., ultimately an image movement 100, is provided to the drive control unit 102 of the drive of the corresponding manipulator. This can generate control signals for the drive, which produces a reverse drifting movement of the manipulator, so that ultimately, the object is again in the desired position in the center of the image acquisition area. Such a position-holding function can be of great advantage, for example, during maintenance work on an object, since the latter can be carried out from a constant relative position.

Figure 4:
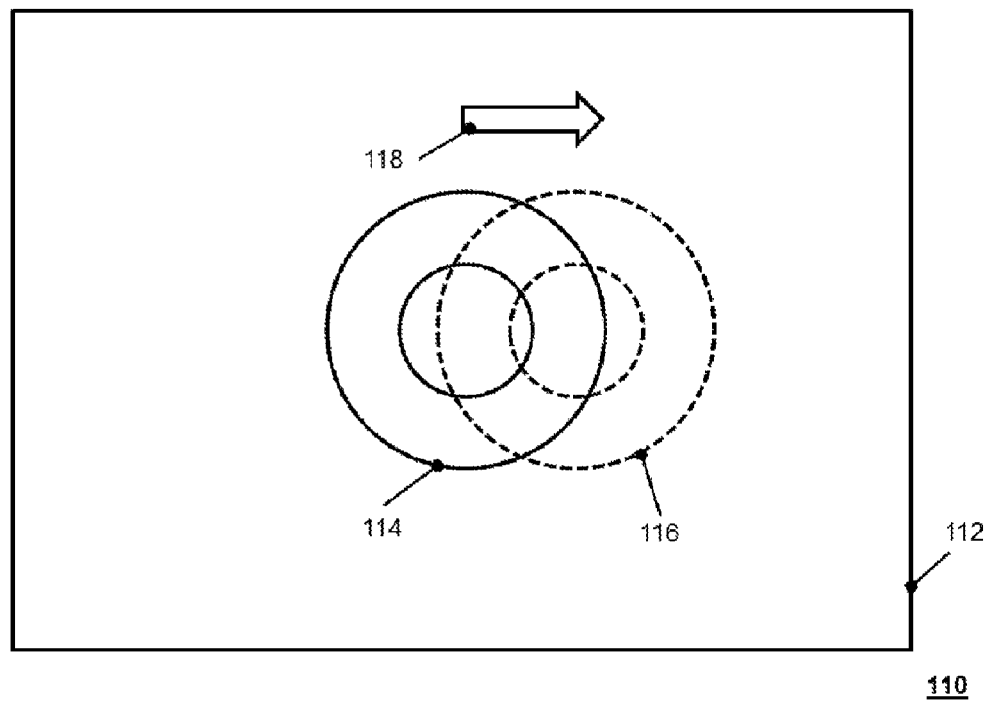
FIG. 4 shows an exemplary positioning diagram.

FIG. 4 shows an exemplary positioning diagram relative to the control diagram of FIG. 3 in a sketch 110. An object in its desired position 114 is shown with solid lines in the center of an image acquisition area 112. The same object is shown in a different position by the reference number 116 and by broken lines. Corresponding to the control diagram of FIG. 3, the drive of the manipulator can be actuated in such a way that the latter executes a corrective movement 118 or a counterdrift movement, so that the object ultimately again lies exactly in the center of the image acquisition area 112.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOL LIST

10 Typical Nuclear Plant Manipulator System
12 Manipulator
14 Image Acquisition Device
16 Image Acquisition Area of the Image Acquisition System
18 Remote-Control Drive 20 Interaction Device
22 Remote-Operating Device
24 Analysis Device
26 Display Device
28 Input Device
30 Data Communication
32 Basin Wall
34 First Object on the Basin Wall
36 Second Object on the Basin Wall
38 Third Object on the Basin Wall
40 Fourth Object on the Basin Wall
42 Fifth Object on the Basin Wall
44 Distance between Objects
50 Typical Process Example for Determining Position
52 State at a First Point in Time
54 State at a Second Point in Time
56 State at a Third Point in Time
58 First Object
60 Second Object
62 Third Object
64 Fourth Object
66 Fifth Object
68 Sixth Object
70 Image Acquisition Area at a First Point in Time
72 Value of the Object Counter at a First Point in Time
74 Image Acquisition Area at a Second Point in Time
76 Value of the Object Counter at a Second Point in Time
78 Image Acquisition Area at a Third Point in Time
80 Value of the Object Counter at a Third Point in Time
82 Forward Motion Direction
84 Reverse Motion Direction
90 Typical Control Diagram for Positioning into Interaction Position
92 Position that is to be Approached
94 Camera Image
96 Image Analysis
98 Requirement: Holding of Position
100 Image Movement
102 Drive Control Unit
110 Typical Positioning Diagram
112 Image Acquisition Area
114 Object in the Desired Position in the Image Acquisition Area
116 Object in the Different Position in the Image Acquisition Area
118 Corrective Movement Produced by the Drive

The invention claimed is:

1. A nuclear plant manipulator system, comprising:
a manipulator with an image acquisition device and a remotely-controlled drive, wherein the image acquisition device is configured to capture image data;
a remote-operating device configured to remotely control the manipulator;
an object counter configured to be incremented or decremented; and
an analysis device configured to:
receive the image data captured by the image acquisition device;
evaluate the received image data; and
automatically identify respective known objects that are found along a path while the manipulator moves along the path, wherein when a respective known object along the path is passed by the manipulator, the object counter is incremented or decremented depending on a direction of the manipulator along the path, and a current value of the object counter is provided to the remote-operating device.

2. The nuclear plant manipulator system according to claim 1, wherein the manipulator is configured to operate under water.

3. The nuclear plant manipulator system according to claim 1, wherein the image acquisition device is configured to pivot relative to the manipulator, such that its image acquisition area can be oriented both crosswise to a feeding direction of the drive and to an identified object.

4. The nuclear plant manipulator system according to claim 1, wherein the remote-operating device comprises:
a display device for depicting the current value of the object counter.

5. The nuclear plant manipulator system according to claim 4, wherein the remote-operating device is configured to cause the display to depict a position of the manipulator based on known distances between the objects passed and based on the current value of the object counter, in place of the current value of the object counter.

6. The nuclear plant manipulator system according to claim 4, wherein the remote-operating device is configured to show the acquired image data on the display device.

7. The nuclear plant manipulator system according to claim 1, wherein the manipulator comprises:
an interaction device for performing mechanical procedures.

8. The nuclear plant manipulator system according to claim 1, wherein the analysis device is configured to generate, based on the image data provided by the image acquisition device, control signals for the drive and to convert the control signals for automatic positioning of the manipulator in an interaction position relative to an identified object.

9. The nuclear plant manipulator system according to claim 2, wherein the image acquisition device is configured to pivot relative to the manipulator, such that its image acquisition area can be oriented both crosswise to a feeding direction of the remotely-controlled drive and to an identified object.

10. The nuclear plant manipulator system according to claim 9, wherein the remote-operating device comprises:
a display device for depicting the current value of the object counter.

11. The nuclear plant manipulator system according to claim 10, wherein the remote-operating device is configured to cause the display to depict a position of the manipulator based on known distances between the objects passed and based on the current value of the object counter, in place of the current value of the object counter.

12. The nuclear plant manipulator system according to claim 11, wherein the manipulator comprises:
an interaction device for performing mechanical procedures.

13. The nuclear plant manipulator system according to claim 12, wherein the analysis device is configured to generate, based on the image data provided by the image acquisition device, control signals for the remotely-controlled drive and to convert the control signals for automatic positioning of the manipulator in an interaction position relative to an identified object.

14. The nuclear plant manipulator system according to claim 4, wherein the remote-operating device is configured to cause the display to depict a position of the manipulator based on known distances between the objects passed and based on the current value of the object counter, together with the current value of the object counter.

15. The nuclear plant manipulator system according to claim 10, wherein the remote-operating device is configured to cause the display to depict a position of the manipulator based on known distances between the objects passed and based on the current value of the object counter, together with the current value of the object counter.

16. The nuclear plant manipulator system according to claim 1, wherein the manipulator comprises:
an interaction device for recording measurement values.

17. The nuclear plant manipulator system according to claim 11, wherein the manipulator comprises:
an interaction device for recording measurement values.

18. A method for controlling a manipulator of a nuclear plant manipulator system including a manipulator with an image acquisition device and a remotely-controlled drive, wherein the image acquisition device is configured to capture image data, a remote-operating device configured to remotely control the manipulator, an object counter configured to be incremented or decremented, and an analysis device configured to receive the image data captured by the image acquisition device, and evaluate the received image data, wherein the method comprises:
positioning the manipulator at a defined starting position in an area of use of a nuclear plant;
manually controlling the manipulator along a path by the remote-operating device;
acquiring continuously the image data by the image acquisition device;
analyzing continuously the image data of the data acquisition device such that respective objects located along the path are automatically identified by the analysis device, and depending on a direction the manipulator moves along the path to pass an object, the object counter is incremented or decremented; and
providing a current value of the object counter to the remote-operating device, so that for the manual control of the manipulator, a reference on the manipulator's current position in an area of use of the nuclear plant is given to the operator.

19. The method according to claim 18, comprising:
Interrupting the movement of the manipulator close to an identified object;
orienting the image acquisition system to the identified object; and
generating and automatically converting control signals for the drive based on the image data, so that the manipulator is automatically positioned into an interaction position relative to the identified object.

20. The method according to claim 19, comprising:
performing a mechanical procedure or a measurement by an interaction device after reaching the interaction position.

* * * * *